C. S. BLUE.
BRAKE MECHANISM.
APPLICATION FILED JULY 6, 1912.

1,123,471.

Patented Jan. 5, 1915.

Witnesses

Cary S. Blue, Inventor,
by C. A. Snow & Co.
Attorneys

UNITED STATES PATENT OFFICE.

CARY S. BLUE, OF CONVERSE, INDIANA, ASSIGNOR OF ONE-HALF TO WILLIAM A. McDANIEL, OF CONVERSE, INDIANA.

BRAKE MECHANISM

1,123,471.  Specification of Letters Patent.  Patented Jan. 5, 1915.

Application filed July 6, 1912. Serial No. 708,077.

*To all whom it may concern:*

Be it known that I, CARY S. BLUE, a citizen of the United States, residing at Converse, in the county of Miami and State of Indiana, have invented a new and useful Brake Mechanism for Automobiles, of which the following is a specification.

The present invention relates to improvements in brake mechanisms for automobiles, the primary object of the invention being the provision of a novel form of brake mechanism, in which the drum is connected to the rear wheels of an automobile and provided with a band brake device concentric thereof for producing the braking effect upon the interior portion of a sprocket wheel which constitutes the main drive for the rear wheels.

With the foregoing and other objects in view which will appear as the description proceeds, the invention resides in the combination and arrangement of parts and in the details of construction hereinafter described and claimed, it being understood that changes in the precise embodiment of the invention can be made within the scope of what is claimed without departing from the spirit of the invention.

Figure 1:
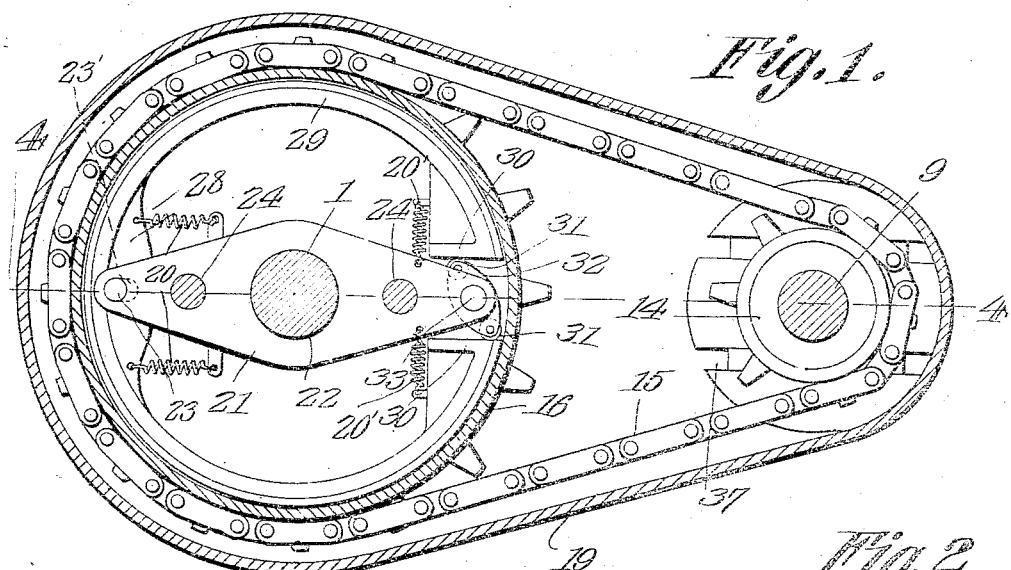
Figure 2:
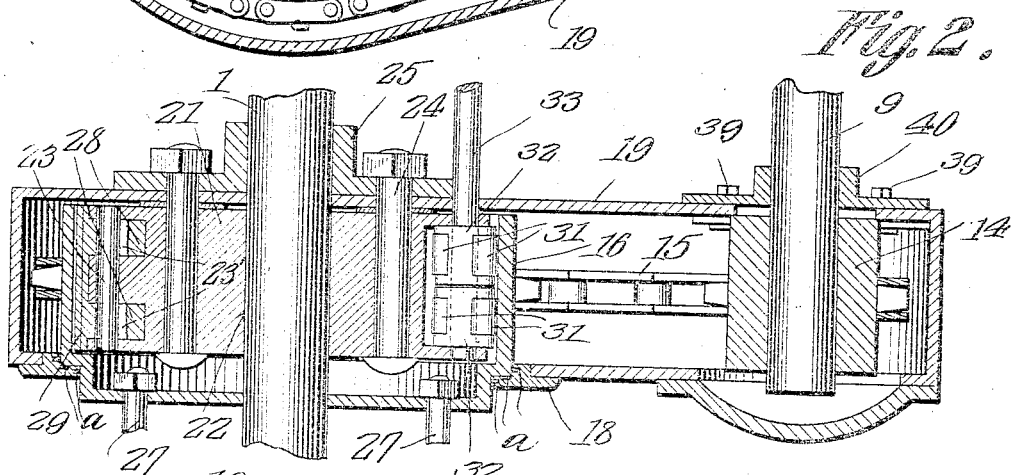
Figures 3, 4:
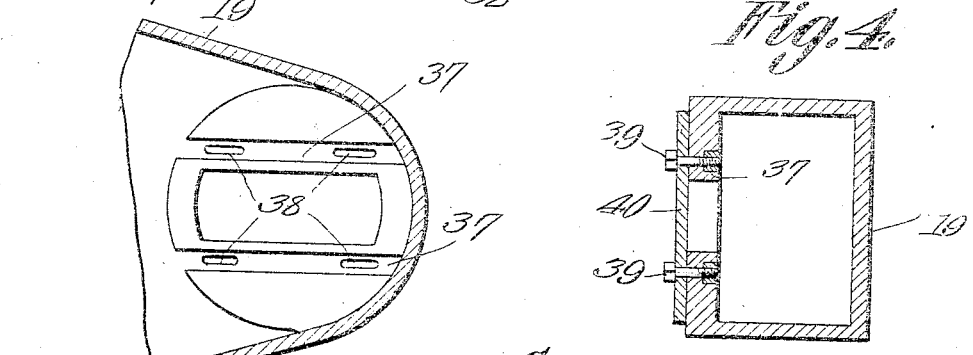

In the drawings Figure 1 is a view in elevation showing a chain drive, a section being taken longitudinally through the chain case and the outer brake and sprocket carrying drum showing the braking mechanism in normal condition. Fig. 2 is a section taken on line 4—4 of Fig. 1 through the complete case. Figs. 3 and 4 are detail views of the forward end of the chain case.

Referring to the drawings, the numeral 1 designates the stationary rear axle, while 9 designates a counter shaft which is adapted to be driven from a prime mover, as for instance, an explosive engine (not shown).

Removably keyed upon the respective ends of the shaft 9 are the small sprockets 14 over which are trained the respective chains 15, there being one chain 15 to each chain casing 19, the detail structure of which is clearly shown. This chain 15 is trained over the large sprocket 16 which is in the nature of a band and is journaled for rotation within the removable ring 18 carried by the outer wall of the casing 19, the said band being connected by means of the bolts 27 to a rear wheel (not shown), said rear wheel being journaled upon the respective ends of the axle 1 so as to properly carry and position the sprocket 16. The frame 21 is provided with the central aperture 22 about the axle, as clearly shown in Fig. 1, with its pivotal pin 23 for the brake band 29, the pins 24 locking the cap 25 rigidly to the frame 21 and the cap 25 to the casing 19. The two springs 20, are employed to centralize the brake band 29 in the drum, while the two springs 20' are to assist in contracting the ends 30 of the band 29. It will also be noted that the band 29 has a slot 23' in its web, thus providing a means to permit the band to locate itself centrally under all conditions. In the free end of the frame 21 is mounted the two arms 32 carrying in their respective terminals, the rollers 31 which are disposed to abut the lugs 30 at the terminals of the band brake 29, whose lugs 28 are pivotally connected to the frame 21. In order to actuate the arms 32 so as to permit of the separation or contraction of the terminals 30 of the band 29, these arms 32 are keyed upon the shaft 33 which is operated by a rod and lever device (not shown).

In order to provide a means by which the chain slackening/or tightening may be adjusted and also to permit of the interchange of the sprockets 14 to increase or decrease the gear of the automobile, the parallel grooves 37 and slots 38 are provided for the reception of the tie bolts 39, which connect the disk 40 to the casing 19.

Packing rings *a* are disposed, as shown in Fig. 2 to prevent dust from entering the casing.

What is claimed is:

The combination with a stationary rear axle, of a brake mechanism, including a member fixedly connected to the axle and having terminals projecting in opposite directions, both terminals being recessed, a brake drum for connection to a rear wheel and incasing said member, an open ring disposed within the brake drum and having a plurality of inwardly projecting lugs pivotally connected to one recessed end of the member, two springs connected to the open ring and to the axle carried member, the spaced terminals of the open ring being disposed one upon each side of the opposite recessed end of the member, the faces of said spaced terminals of the ring being inwardly projected and normally in parallel, a reinforcing rib connected to each inwardly projecting end and the adjacent portion of the ring, the normal tension of the ring being to move the spaced terminals toward each other, and an oscillatory means disposed between the terminals of the open ring and mounted in the axle carrying member for moving the terminals away from each other and into engagement with the brake drum.

In testimony that I claim the foregoing as my own, I have hereto affixed my signature in the presence of two witnesses.

CARY S. BLUE.

Witnesses:
CICERO L. MILLER,
LEROY O. ARNOLD.